Figure 1:
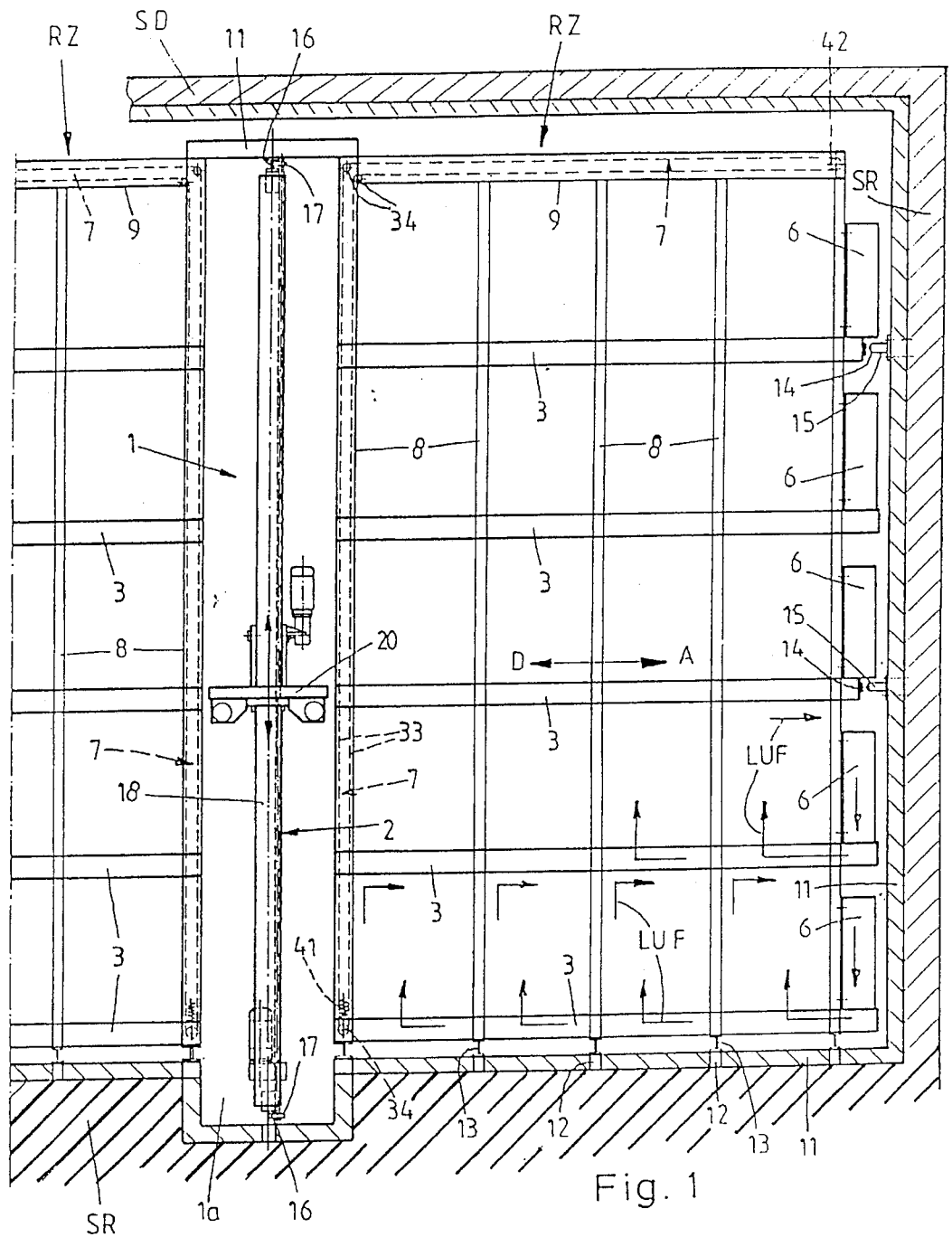

United States Patent [19]

Upmeyer

[11] Patent Number: 5,562,062
[45] Date of Patent: Oct. 8, 1996

[54] PALLET SHELF SYSTEM FOR/IN A WATERCRAFT, PREFERABLY A REFRIGERATOR VESSEL

[75] Inventor: Ulrich Upmeyer, Borgholzhausen, Germany

[73] Assignee: Westfalia-WST-Systemtechnik GmbH & Co. KG, Borgholzhausen, Germany

[21] Appl. No.: 545,720

[22] PCT Filed: Mar. 1, 1995

[86] PCT No.: PCT/EP95/00738

§ 371 Date: Nov. 2, 1995

§ 102(e) Date: Nov. 2, 1995

[87] PCT Pub. No.: WO95/23730

PCT Pub. Date: Sep. 8, 1995

[30] Foreign Application Priority Data

Mar. 3, 1994 [DE] Germany ............... 44 07 048.9

[51] Int. Cl.[6] .................................. B63B 25/00
[52] U.S. Cl. ........................................... 114/72
[58] Field of Search .................. 62/240; 104/48; 414/266, 267, 273, 279; 114/72, 73, 76

[56] References Cited

U.S. PATENT DOCUMENTS 3,537,414  11/1970  Goldman ....................... 114/72
3,880,299   4/1975  Zollinger et al. .
4,633,799   1/1987  Hey ............................... 114/72
5,107,781   4/1992  Ebeling et al. ................ 114/72

FOREIGN PATENT DOCUMENTS 2584366  1/1987  France .
1556673  3/1970  Germany .
2507535  8/1975  Germany .
1381565  1/1975  United Kingdom .

*Primary Examiner*—Stephen Avila
*Attorney, Agent, or Firm*—Browdy and Neimark

[57] ABSTRACT

The pallet shelf system for/in a refrigerator ship has a number of bays (RZ), disposed on both sides of a shelf corridor (1) with a shelving vehicle (2) movable in the corridor, with channel-like supporting and running guides (3) arranged in tiers for pallets (4) to be set down on the guides and satellite cars (5) movable in them. On their lengthwise end remote from the corridor (1), the supporting and running guides (3) are assigned air ducts (6), which together with the supporting and running guides (3) and the set-down pallets (4) form an air circulation guide (LUF). Each of the bays (RZ), on its loading and unloading face end toward the corridor (1), is assigned one air lock (7) that closes the bay (RZ) over its entire height and is to be opened for loading and unloading.

21 Claims, 7 Drawing Sheets

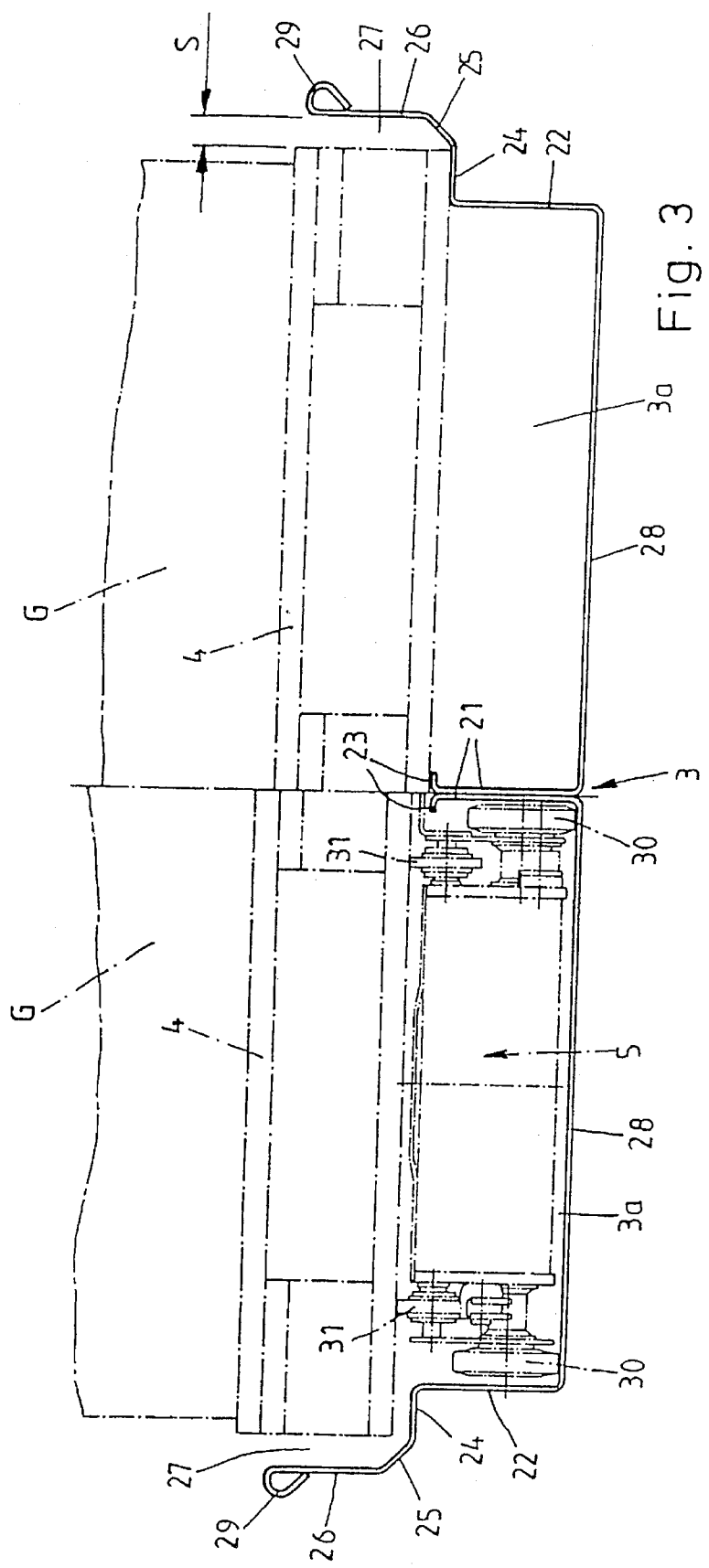

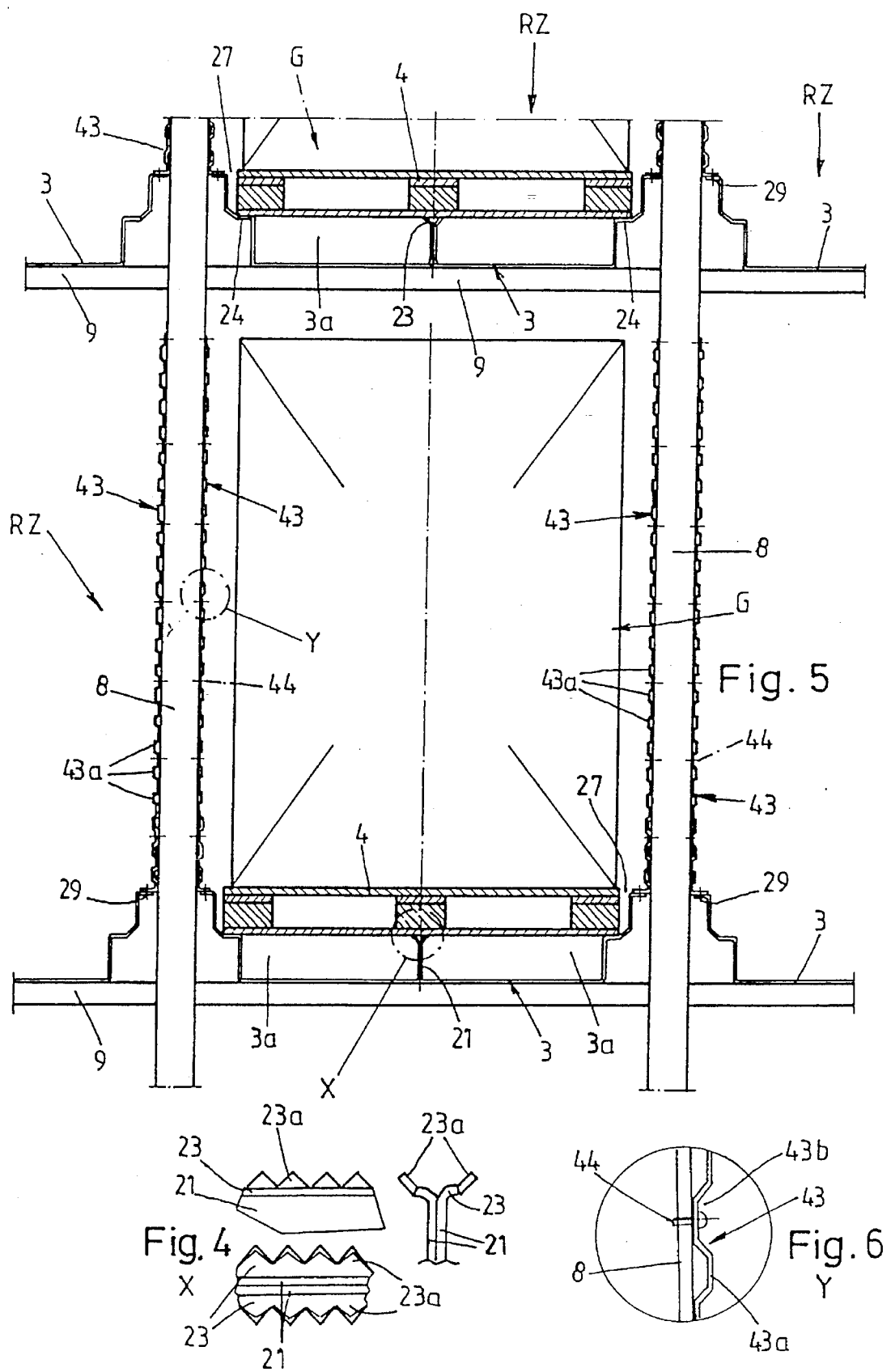

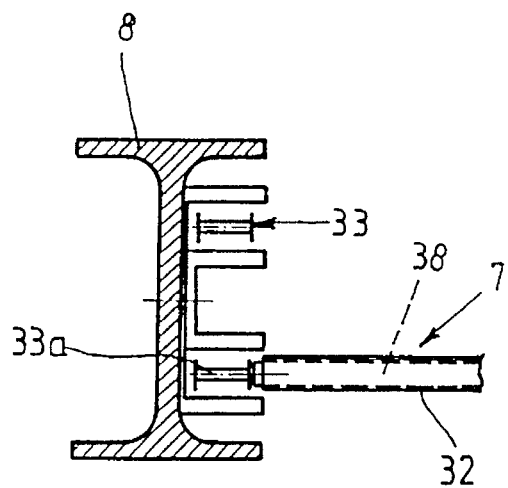
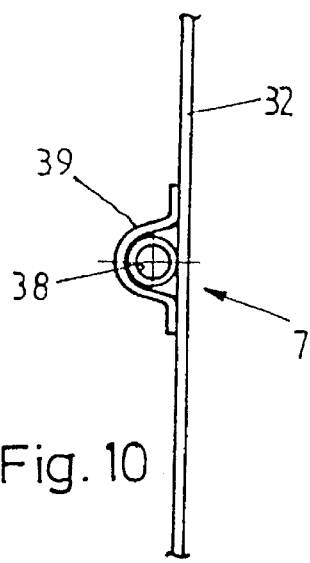
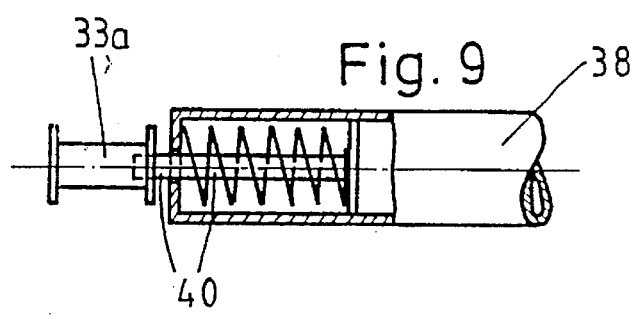
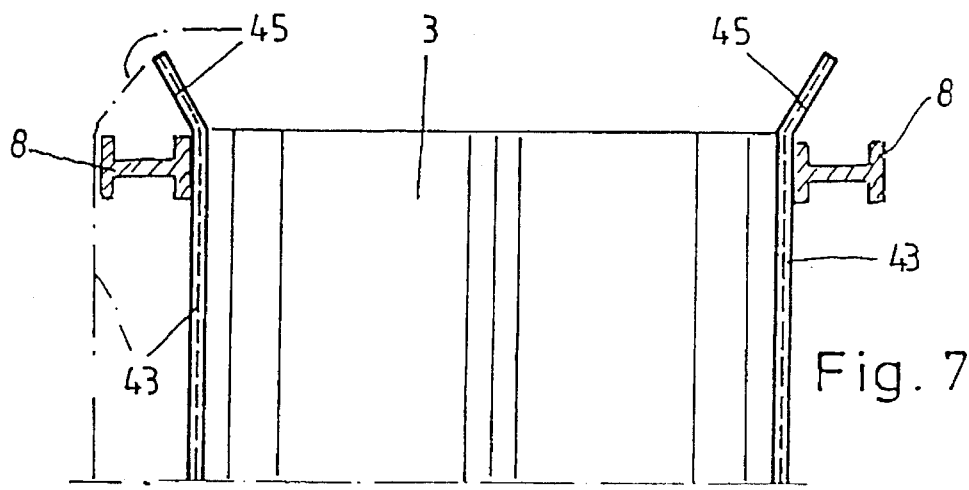

PALLET SHELF SYSTEM FOR/IN A WATERCRAFT, PREFERABLY A REFRIGERATOR VESSEL

The invention relates to a shelf system, preferably a pallet shelf system, in which goods (products) of the most various kinds, especially tropical and subtropical fruit, that require air cooling can be stored and transported in a refrigerator ship.

The object of the invention is to create a pallet shelf system with a high carrying capacity of goods on pallets for/in a refrigerator ship that produces optimal air conduction and low-loss air cooling in its bays of shelves, enables rational loading and unloading of the bays of shelves, and positionally fixes the pallets and goods in the bays of shelves and keeps them secured against shifting and damage when the ship is in motion.

This object is attained by the characteristics of the body of claim 1.

The appended dependent claims recite embodiment characteristics, which are advantageous and recommended further feature of the aforementioned means of attaining the object, as well as the additional object of being able to mount the shelf system in the hull of the ship with maximal avoidance of cold bridges in the ship insulation, to embody it so that it is stabilized against ship motions, and to equip it with means that move the pallets with goods gently and in a positionally fixed manner, transport them into and out of the refrigerator ship, and load and unload the bays of shelves, in a simple manner with safe function and a rational mode of operation in the form of existing components and additional parts.

The pallet shelf system according to the invention is designed among other purposes for being built into refrigerator ships that are provided for transporting air-cooled goods of the most various types, especially tropical and subtropical fruit.

This pallet shelf system is composed of a number of bays, disposed on both sides of a shelving corridor inside the hull and joined to the hull of the ship and to partition walls (bulkheads); the shelf bays on either side (to the left and right) of the shelving corridor each form one shelf block.

These bays are formed of upright shelf supports and horizontal bearers and supporting and running guides disposed in tiers; these guides extend from the shelving corridor to the side wall of the hull, and they receive a channel vehicle (satellite car) for transporting the pallets with the goods into the bays and also carry the set-down pallets with goods.

Each tier of the bays is assigned one air duct adjacent to the side wall of the hull, and an air lock is provided on the end wall toward the corridor; a recirculation of the air cooling is effected by means of the air duct and the supporting and running guides and by the air lock in every tier, and hence the cooling of the goods is carried out in a self-contained region, which assures optimal, low-loss cooling and is space-saving in terms of height.

The bays facing one another on either side of the corridor each communicate with each other via a bridge at the top, which serves to stabilize the left and right blocks of shelves, which each comprise a plurality of bays. These bridges are independent of or are detached from the ship deck and secured to the shelf supports, so that a sagging, loaded ship deck does not influence them.

The gangway for the shelving vehicle that runs in the corridor is sunken in the hull, and this shelving vehicle, because of positive-engagement guide and transmission means, such as toothed racks and gear wheels, mounted in the shelf gangway and under the bridges, runs without being vulnerable to ship motions (tilting forces) that act on the shelving vehicle and to external influences for moisture or the like. Moreover, as a result of this guide transmission, the shelving vehicle reaches its two terminal positions very rapidly.

Because the gangway for the shelving vehicle is sunken in the hull, the minimum structural height of the shelving vehicle is reduced, and at the same time a more favorable center of gravity for the ship whose deck is loaded with goods is attained, so that the ship need not be built substantially higher.

The supporting and running guides in the form of running tracks on the one hand transmit shear forces from the shelf to the ship hull and on the other serve to support the air ducts, and form a walkway for correcting problems and performing maintenance and form the supporting construction for the cargo.

These supporting and running guides also provide a receptacle and guidance for the satellite car and in combination with the air duct they accomplish the carrying of fresh air and exhaust air, which are largely separated from one another. The fresh air is blown into the running tracks by the air duct and then flows through the pallets and the goods on them and is then removed by suction as exhaust air to the ship hull.

The pallet shelf system is secured laterally to the ship hull and to the partition walls (bulkheads), in order that horizontal forces will be transmitted from the shelf to the ship hull.

The horizontal forces from the shelf are introduced into the hull from the encompassing horizontal bearers by means of a few braces, so that the insulation of the hull is interrupted at as few points as possible, thus averting cold bridges.

The individual shelf supports are secured on load carriers that are fixed to the hull at a few points, so that once again the hull insulation is interrupted at only a few points to avoid cold bridges.

The loading and unloading end of the bays toward the corridor and the top of the bays are closed and opened by the air lock, which is embodied by an encompassing conveyor with a tarpaulin secured to it; the tarp can be opened from bottom to top by the conveyor and thus allows loading and unloading of the various tiers of the bays.

The motor-driven conveyor is guided by its endlessly revolving chains, belts or cables in the upright vertical supports and the upper shelf bearers via deflecting devices, and it receives the tarp by loop connections at crosswise-extending bars; the tarp is intrinsically flat on the side toward the inside of the bays, so as not to create any disturbance of the goods.

The crossbars for retaining the tarp on the chains are in a preferred way detachably fixed in the chain links by spring-loaded detent protrusions, so that for maintenance work on the engine, for changing any crossbars that might have become bent and for inspecting the entire air lock, these crossbars can simply be removed from the conveyor, thus providing good access to the entire air lock and to the driving and deflection station.

The air ducts form an impact wall for the pallets, carrying goods, that are to be put into place, so that they are braked in their motion in the horizontal direction of the bays. The air lock with its tarp again provides an impact wall against cargo that might fall down or shift and at the same time serves to guide air within the individual receiving channels of the bays.

The air duct and the tarp also secure the cargo against shifting from the motions that ensue when the ship is underway.

Metal beaded plates extending over the entire height and depth of the bays are secured to the inside of the vertical shelf supports of each bay; the beads extend horizontally and on the one hand define the air guidance and on the other serve as impact or guide walls for the pallets carrying cargo. As a result of these beaded plates, the cargo cannot fall downward or tilt from ship motions but instead is securely guided in its tier in the bays.

The securing of these beaded plates is done by fasteners that rest in the trough between beads, and as a result the aforementioned beads that form the guidance or impact face are not impaired and hence the cargo is given a smooth, friction-reducing guidance.

The horizontal beads also lend the beaded plates increased stability; the beaded plates are manufactured in one piece, so that there are no edges that are an obstacle to the cargo and the pallets on insertion or removal by the satellite car, and hence the cargo remains securely on the pallets.

The refrigerator ship is equipped with a loading and unloading hatch in the region of the deck; through this hatch, the pallets with goods are brought into the ship and to the shelf.

To that end, all that is needed in the deck is a rectangular opening, which can be closed by a simple flap. For conveying the cargo, a carriage with a cantilevered arm is mounted on a vertical guide; it can move through the opening without additional seals being provided in the region of the opening and flap, which enables economical loading and unloading in a manner that is simple from the standpoint of insulation.

The ship is also provided with a transport basket and a continuous conveyor, preferably a roller track, which likewise in a positionally fixed and nontouching manner enables loading and unloading of the transport basket and setting down of the transport basket onto the roller track in order to distribute the pallets that carry goods.

The traveling basket is open on all sides, so that it can be loaded by suitable devices, such as fork loaders. Positioning aids separate the cargo units without contact later in the course of travel of the cargo unit, so that touching of the cargo unit is avoided, and they provide freedom for the load receiving means of the forklift on moving inward and outward.

The entire shelf system with its additional auxiliary aids and transport devices as well as positional fixing devices is simple and economical in design, easy to mount stably in the ship, receives the goods to be transported securely and in a fixed position, and enables problem-free introduction and removal of these goods in a rational, gentle manner.

With its supporting and running guides, the air ducts and the air lock, the pallet shelf system intrinsically forms an independent subject of the invention in combination with its manner of being mounted in the ship, and it additionally represents a further concept of the invention in combination with the satellite car, shelving vehicle, loading and unloading hatch, and transport basket with roller track.

Figure 2:
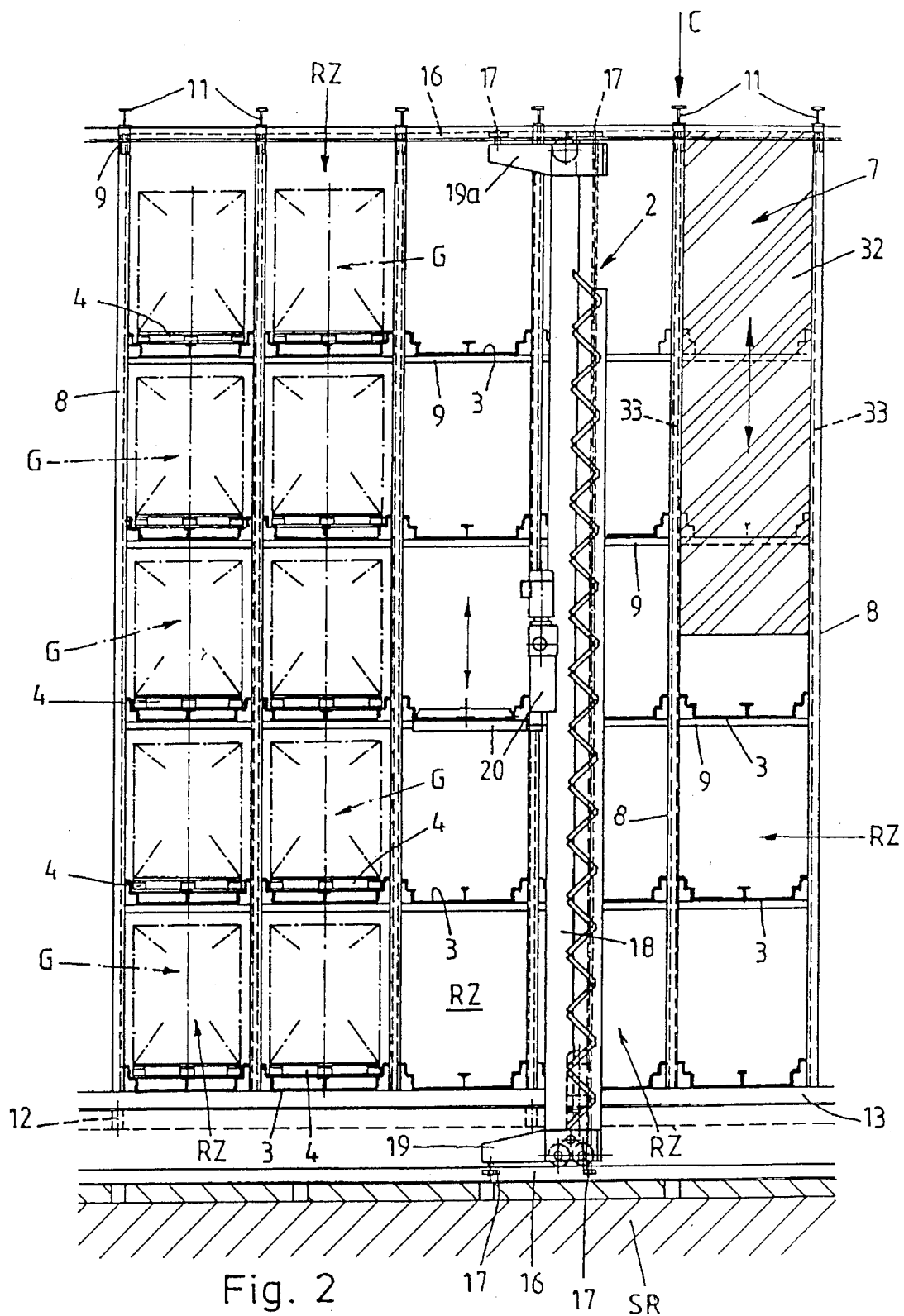
Figure 11:
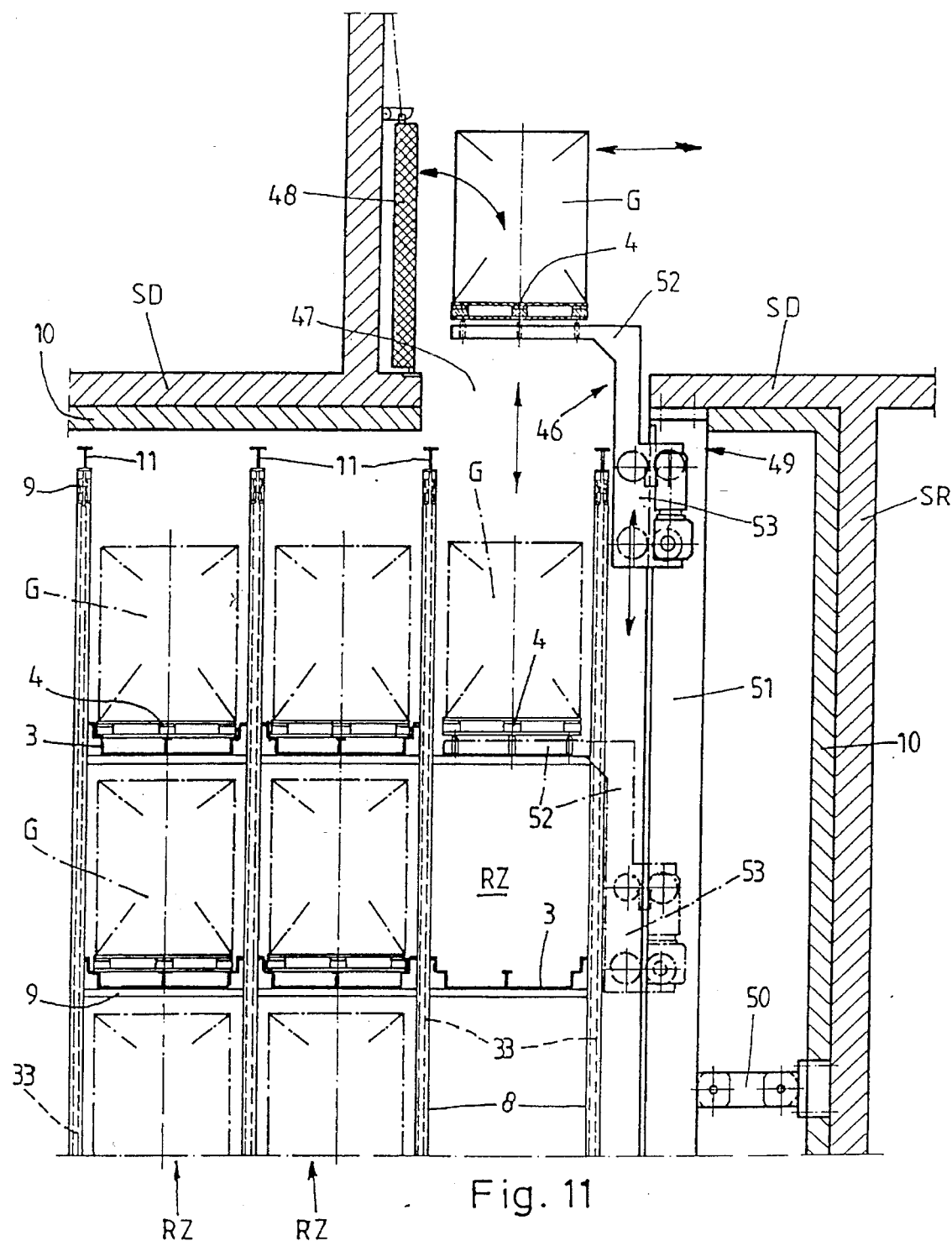
Figure 12:
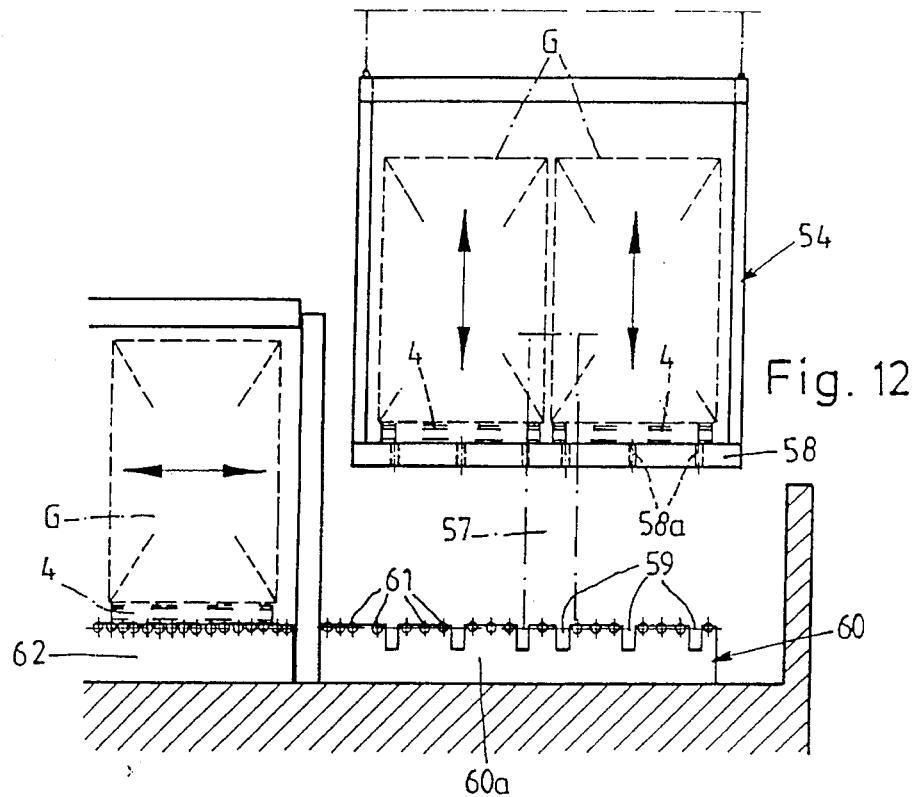
Figure 13:
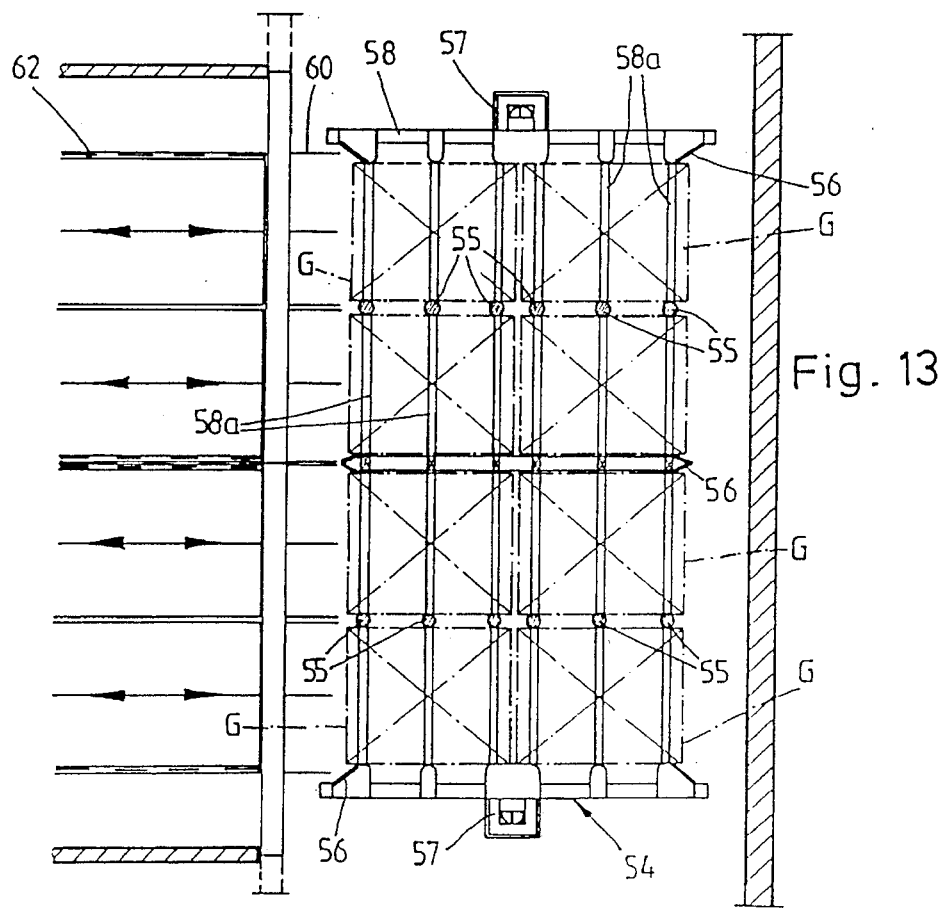

One exemplary embodiment of the invention is shown in the drawings and will be described in detail below. Shown are:

FIG. 1, an end view of a portion of a pallet shelf system built into a refrigerator ship, with shelf bays disposed on both sides of a shelving corridor for a shelving vehicle, with supporting and running guides disposed in tiers, with air ducts associated with them, and with an air lock toward the corridor;

FIG. 2, a front view of the same pallet shelf system, seen from the corridor;

FIG. 3, a front view of the supporting and running guide, formed by a running track, for a satellite car for the process of palleting and setting down of the pallets on the running track, showing the pallet transport position in the left half of the drawing and the pallet in the set-down position in the right half of the drawing;

FIG. 4, a side view, front view and plan view of support flange tooth rack of the running track in the detail X in FIG. 5;

FIG. 5, a front view of two running tracks, disposed one above the other between vertical shelf supports, with set-down pallets and with beaded plates secured to the shelf supports;

FIG. 6, a detail Y of the beaded plate of FIG. 5;

FIG. 7, a plan view on two beaded plates with inlet slides;

FIG. 8, a plan view on a chain of a revolving conveyor of the air lock, with a crossbar secured to the chain and a tarp, seen in the direction of the arrow C of FIG. 2;

FIG. 9, a plan view in fragmentary section of a lengthwise end of the crossbar with a detent protrusion;

FIG. 10, a side view of the portion of the air lock tarp with loop fastening at the crossbar;

FIG. 11, a front view of a portion of the shelf system with a loading and unloading hatch in the ship deck and with a vertical carriage with a cantilevered arm;

FIG. 12, a side view of a transport basket and a roller track;

FIG. 13, a plan view of the transport basket and the roller track.

The pallet shelf system for/in a refrigerator ship, for transporting goods (products) that require air cooling of the most various kinds, especially tropical and subtropical fruits, meat or the like, has a number of shelf bays (RZ), disposed on both sides of a shelving corridor (1) with a shelving vehicle (2) movable in it, and the bays have tracklike supporting and running guides (3), arranged in tiers, for pallets (4) to be set down on them and for a satellite car (5) movable in these guides.

Air ducts (6) are assigned to the supporting and running guides (3) on the lengthwise end thereof remote from the corridor (1); these ducts, together with the supporting and running guides (3) and the set-down pallets (4), form an air circulation guide (LUF) (FIG. 1).

Each bay (RZ), on its loading and unloading end toward the corridor (1), is assigned one air lock (7) that closes the bay (RZ) over its entire height and on its top and is to be opened for loading and unloading (FIG. 1 and 2).

The shelf system has a number of horizontal bearers (9) that carry the supporting and running guides (3) and are located on and thus connected to the vertical shelf supports (8); the shelf supports (8) are secured to horizontal fastening blocks (12), disposed in an insulation (10) of the ship hull (SR), by load bearers (13) that are connected to the ship hull (SR) (FIG. 1).

Individual horizontal bearers (9) are horizontally braced (FIG. 1) against the hull (SR) by their lengthwise end toward the air duct with horizontal lateral bearers (14), via support blocks (15) disposed on an insulation (10) of the hull (SR).

Each two bays (RZ) facing one another on either side of the corridor (1) are joined together and stabilized against one another by means of a bridge (11) that spans the corridor (1) and is located connectionless to and under the deck (SD) of the ship, and as a result the blocks of shelves are rigidified on the right and left of the corridor.

The shelving vehicle (2) travels on its bottom in a gangway (1a) of the corridor (1) that is lowered in the hull (SR) relative to the level on which the bays (RZ) stand and the vehicle is moved in the gangway (1a) and on its top end below the bridges (11) by means of positive guide means (16, 17).

In a preferred manner, toothed racks (16) and gear wheels (17) are provided as the positive guide means (16, 17), and there is one toothed rack (16) under each of the bridges (11) and in the gangway (1a), with which toothed racks the shelving vehicle (2) cooperates by means of top and bottom gear wheels (17) (FIGS. 1 and 2). Instead of toothed racks (16, 17), chains, spindles or the like may be used for positive guidance and transmission of motion.

The air ducts (6) are adjacent to the hull insulation (10) and are carried by the rear ends, in terms of the loading direction (A), of the supporting and running guides (3) and are secured to the shelf supports (8), as can be seen from FIG. 1; the loading direction for the corridor (1) is marked D.

The shelving vehicle (2) in a known manner has a frame mast (18), which on the lower end is braced on an undercarriage (19) with power takeoff; the gear wheels (17), which mesh with the toothed rack (16) as a running rail for the undercarriage (19), are supported on the undercarriage (19). The gear wheels (17) that mesh with the toothed rack (16) fixed under the bridges (11) are supported at the top on the frame mast (18) on a trolley (19a).

The toothed rack (16) in the corridor (1a) is also, like the supports (8), braced at only a few points (12) relative to the hull (SR).

A cross arm (20) for lifting is guided so as to be adjustable in height on the frame mast (18) and moves the satellite cars (5) to the various tiers of the bays (RZ) for loading and unloading the pallets (4) with goods (G).

The supporting and running guide (3) for the pallets (4) to be set down on it and the satellite car (5) for the pallets (1) is movable in it, as clearly shown in FIG. 3, is formed by a running track (3) or running tub, which has at least two lateral upright guide legs (21, 22) for the satellite car (5), at least two lateral, horizontal support flanges (23, 24) for the pellets (4), two centering strips (25) adjoining the support flanges (24) at the top and oriented outward, and two upward-pointing guard rim (26), extending at a distance (F) from the pallet (4) and adjoining the centering strips (25).

The running track (3) itself, which is a free space (27) between the guard rims (26) and the pallet (4), and the pallet (4) together form air guides, and the free space (27) between the guard rims (26) and the pallet (4) provides a receptacle for lashing means, preferably air-filled load securing hoses for the goods (G) carried with the pallet (4). The running track (3) is composed of two identical channels (3a) of identical U-shaped cross section arranged in mirror symmetry. Each channel (3a) has two upright guide legs (21, 22) extending from a flat channel bottom (28), as well as two horizontal support flanges (23, 24), a centering strip (25), and a guard rim (26). Each channel (3a) has a first upright guide leg (21), bent at an angle from the channel bottom (28), with a horizontal first support flange (23) bent at the top toward the channel center, and the two channels (3a) are joined to the running track (3) by welding or the like by way of these two first guide legs (21) contacting one another.

Each channel (3a) has a second upright guide leg (22), bent at an angle from the channel bottom (28), as an outer leg of the track, and a second support flange (24) is bent outward at the upper end of this second guide leg (22).

The second support flange (24) is adjoined by the centering strip (25), which is bent obliquely upward and outward and which may also be embodied in curved fashion.

The upright guard rim (26) is formed onto this centering strip (25) with an outward-pointing edge profile formed onto the upper end.

The centering strip (25) is at an angle of 45° from the second support flange (24), and the second support flange (24) toward the centering strip has a greater width than the first support flange (21) toward the channel connection.

Each channel (3a) is integrally formed of sheet metal.

The satellite car (5) is embodied as a satellitelike industrial truck with driven running wheels (30), and with driven support and displacement wheels (31), chains or the like that lift the goods (G) from the support flanges (23, 24) and carry and displace them.

In particular, the running track (3) is provided for transporting pallets (4) with goods (G) that require ventilation, such as tropical and subtropical fruit (bananas, kiwi fruit) on ships.

When motion occurs during transport (when the ship rocks), the centering strips (25) prevent the pallet (4) from slipping, so that it is held stably on the support flanges (23, 24).

The receiving space (27) between the pallet (4) and the guard rim (26) allows lashing means, in particular air-filled low securing tubes, to be introduced in order to lash down the pallet (4) carrying goods (G) on the running track (3).

The U-shaped channels (3a) serve on the one hand to allow the entry of the satellite car (5) and on the other to carry fresh air through them; the pallets (4) themselves and the free space (25) also allow air to be carried, thus optimally ventilating the goods (G).

Two coupled satellite cars (5) for pallet transport preferably move in the two channels (3a).

FIG. 3 on the left shows the pallet (4), carried and movable by the satellite car (5) at a distance above the support flanges (23, 24), and on the right the pallet (4) set down onto the support flanges (23, 24).

The running track (3) may be embodied integrally with only two bracing points, specially the support flanges (24), or as FIG. 3 shows with three pallet bracing points, specifically the middle support flanges (23) and the two outer support flanges (24).

The two support flanges (23) for the central bracing of the pallet (4) are embodied preferably as toothed racks (23a) pointing upward and outward, as shown in FIG. 4, thus bringing about an additional anchoring in the wooden parts of the pallet (4). These toothed racks (23a) may also be formed out of the outer support flanges (24).

The air lock (7) of FIGS. 1, 2 and 8–10 is composed of a flexible part (32) and a motor-driven endlessly revolving conveyor (33) that moves the tarp (32) in the vertical direction from bottom to top and vice cersa and on the top of the bay (RZ) to open and close the bay (RZ).

The conveyor (33), in the two vertical shelf supports (8) and in the upper horizontal bearers (9) of each bay (RZ), has chains, belts or cables revolving endlessly via deflection devices (34), with cross bars (38) or crosswise tubes detachably fixed between them, on which, by means of loops (39), the tarp (32) which is intrinsically flat (smooth) with respect to the pallets (4) with goods (G) stored there is mounted in a positionally fixed manner. The cross bars (38) are always located toward the corridor (1), so that the tarp (32) is intrinsically flat relative to the interior of the bays.

The cross bars (38) are preferably fixed detachably, with spring-loaded detent protrusions (40) on both ends, in retaining straps (39) or chain links of the chains (33a), belts or cables, and as a result it is simple to replace the cross bars (38) or to remove or partially detach the tarp (32) for maintenance work.

Deflection wheels or rollers (34) are rotatably supported in the lower and upper end region of the vertical shelf supports (8), and the lower deflection wheels or rollers (34) are under spring tension—compression or tension spring (41); a drive motor (42) is disposed between the lengths of tarp (32) in the lengthwise end, adjacent to the hull (SR) of the upper bearers (9), and the drive motor is likewise accessible for maintenance work by loosening individual cross bars (38) and lifting the tarp (32).

The tarp (32) comprises a length of woven fabric, a length of plastic-coated cloth, a plastic film, or the like, and has a length that is at least equal to the height of the bay (RZ). The tarp (32) is slipped firmly with its loops (39) onto the cross bars (38), as a result of which it is securely held against creeping laterally on the cross bars (38).

As FIGS. 5, 6 and 7 show, beaded plates (43) extending over the entire height and depth of the bay are disposed as impact and airlock walls on the insides of the shelf supports (8) that define the width of the bay; the beads (43a) of these plates extend in the horizontal depthwise direction of the bay (RZ), and fastening means (44) for retaining the beaded plates (43) on the shelf supports (8) are located in recessed fashion in the troughs (43b) between beads, while the raised beads (43a) form guides for the pallets (4) and goods (G) that are to be inserted and removed.

The beads (43) for both sides of the bay are each embodied in one piece and on the lower end are joined to the edge profile (29) or to an edge flange (29) bent outward (FIG. 5) from the guard rim (26).

The beaded plates (43) of each bay (RZ) each have, on their end toward the corridor, a beveled and/or curved inlet slide (45) for the pallets for carrying goods (G) (FIG. 7).

In FIG. 1, a loading and unloading hatch (46) is shown, which has a flap (48) pivotably supported in the ship deck (SD) and closing off an opening (47) in the deck (SD) in sealed fashion, the flap being of polygonal and preferably rectangular shape, and a hoisting device (49) for inserting the pallets (4) carrying goods (G) into and removing them from the shelf system.

The lifting device (49) has a vertical guide (51), which is fixed to the underneath of the ship deck (SD) and is movably joined to the hull (SR) via a movable bearing (50), and which has a vertical carriage (53) that is movable by motor along the vertical guide (51) and carries a cantilevered arm (52) that is vertically movable through the opening (47) in the deck (SD).

FIGS. 12 and 13 show a transport basket (54) that can be loaded with pallets (4) and unloaded of these pallets from all four sides, the basket having a rectangular shape and having centering protrusions (55) and inlet slides (56) for the pallets (4), and a roller track (60), which receives the transport basket (54) both between upright guides (57) and by its lower frame (58) in insertion depressions (59); the rollers (60a) of this roller track lift the pallets (4) from the frame (58) and move it out of the transport basket (54) and transfer them to a connected conveyor (62).

The transport basket (54) can be loaded from all sides with a plurality of pallets (4) carrying goods (G) by means of forklifts or the like; the pallets (4) are set down on the frame (58) of the transport basket (54) in a precisely centered manner by means of the centering protrusions (55) and the inlet slides (56). As a result of these centering protrusions (55) and inlet slides (56), touching of the pallets (4) and goods (G) in the process of removal by the roller track (60) is avoided.

The transport basket (54) is moved by a crane and lowered vertically onto the roller track (60), guided between the vertical guides (55) thereof; the supporting beams (58a) of the basket frame (58) plunge into the groovelike or slitlike insertion depressions (59), and the frame (58) is braced against the roller track frame (60a), whereupon the rollers (61) have slightly raised the pallet (4) in order to convey it out of the basket frame (58).

This transport basket (54) and the roller track (60) serve to insert or remove the goods (G) along with the pallets (4) into and from the refrigerator ship, and the roller track (60) is disposed in the refrigerator ship. However, it may also be installed on the pier in the harbor.

I claim:

1. A shelf system for/in a refrigerator ship, having a shelving vehicle (2) movable in a shelf corridor (1), the vehicle having an adjustable-height lifting cross arm and a number of shelf bays (RZ) disposed on both sides of the corridor (1), which have supporting and running guides (3) arranged in tiers for pallets (4) to be set down on the guides and satellite cars (5) movable into them, characterized in that the supporting and running guides (3) are each embodied as a track (3) having at least two supporting and centering means (24, 26/23) for the pallets (4) and at least one channel (3a) for the running guidance of the satellite car (5), that one air duct (6) is assigned to the tracks (3) of the bays (RZ) in each tier, on the lengthwise end thereof remote from the corridor (1), which duct with the tracks (3) forms an air circulation guide (LUF), and fresh air is blown from the air duct (6) into each track (3) and flows through the pallet (4) and the goods (G) on it and then is removed as waste air to the ship hull (SR), and that each bay (RZ), on its loading and unloading face end toward the corridor (1), is provided with an airlock (7) that closes the bay (RZ) over its entire height and can be opened for loading and unloading.

2. The shelf system of claim 1, characterized in that each track (3) has at least two lateral, upright guide legs (21, 22) for the satellite car (5), at least two lateral, horizontal support flanges (23, 24) for the pallets (4), two centering strips (25) adjoining the support flanges (24) and pointing upward and outward and spaced apart by a distance (S) from the pallet (4), and two guard rims (26), adjoining the centering strips (25) and pointing upward and spaced apart by the distance (S) from the pallet (4), wherein the track (3) with its channel (3a) and the pallet (4), forms an air guide and creates, between its guard rims (26) and the received pallet (4), a free space (27) for lashing means for the pallet (4) with the goods (6) received on it.

3. The shelf system of claim 1, characterized in that the track (3) is composed of two channels (3a) of identical cross section, arranged in mirror symmetry, of U-shaped cross section, and each channel (3a) has a first upright guide leg (21), bent at an angle from the channel bottom (28), with a horizontal first support flange (23) bent at an angle at the top toward the center of the channel, and these two first guide legs (21) contact one another and connect the two channels (3a) with the track (3), each channel (3a) has a second upright guide leg (22), bent at an angle from the channel bottom (28), as the outer leg of the channel, on the upper end of the second guide leg (22), a second support flange (24) is bent outward at an angle, each channel (3a) has a centering strip (25) bent obliquely upward and outward at an angle on the second support flange (24), and the upright guard rim (26) is formed onto the centering strip (25) with an outward-oriented edge profile or flange (29) formed onto it at the upper end.

4. The shelf system of claim 3, characterized in that the centering strip (25) is at an angle of 45° from the second support flange (24).

5. The shelf system of claim 4, characterized in that the second-support flange (24) toward the centering strip has a greater width than the first support flange (23) located toward the channel connection.

6. The shelf system of claim 3, characterized in that the two support flanges (23), for central bracing of the pallet (4), are formed into upward- and outward-pointing toothed edges (23a).

7. The shelf system of claim 1, characterized in that the air ducts (6), adjacent to a ship hull insulation (10), are carried by the rear ends of the track (3), in terms of the loading direction (A), and are secured on shelf supports (8).

8. The shelf system of one of claim 1, characterized in that the air lock (7) is formed by a flexible tarp (32) and a motor-driven, endlessly revolving conveyor (33) that moves the tarp (32) vertically and on the top of the bay (RZ) from bottom to top and vice versa.

9. The shelf system of claim 8, characterized in that the conveyor (33) of the airlock tarp (32) has chains (33), belts or cables, endlessly revolving via deflection devices (34) in vertical shelf supports (8) toward the corridor (1) and upper horizontal bearers (9), with cross bars (38) detachably fixed between the chains, belts or cables, on which cross bars by means of loops (39) the tarp (32), which is intrinsically flat (smooth) with respect to the pallets (4) carrying goods (G) stored in the shelves, is mounted in a positionally fixed manner.

10. The shelf system of claim 9, characterized in that the cross bars (38) are releasably fixed, by spring-loaded detent protrusions (40) on both ends, in retaining straps or chain links (33a) of the chains (33), or belts or cables.

11. The shelf system of one of claim 9, characterized in that deflection wheels or rollers (34) are rotatably supported in the lower and upper end region of the vertical shelf supports (8), and the lower deflection wheels or rollers (34) are under spring tension (41), and a drive motor (42) is disposed in the lengthwise end, adjacent to the ship hull (SR), of the upper, horizontal bearers (9) between the lengths of tarp (32).

12. The shelf system of claim 9, characterized in that the tarp (32) is formed of a length of woven fabric, a length of plastic-coated cloth, a plastic film, or the like, and has a length that is at least equal to the height of the bay (RZ).

13. The shelf system of claim 9, characterized in that beaded plates (43) extending over the entire height and depth of the bay are disposed as impact and airlock walls on the insides of the shelf supports (8) that define the width of the bay; the beads (43a) of these plates extend in the horizontal depthwise direction of the bay (RZ), and fastening means (44) for retaining the beaded plates (43) on the shelf supports (8) are located in recessed fashion in the troughs (43b) between beads, while the raised beads (43a) form guides for the pallets (4) and goods (G) that are to be inserted and removed.

14. The shelf system of claim 13, characterized in that the beads (43) for both sides of the bay are each embodied in one piece and on the lower end are joined to the edge profile (29) or to an edge flange (29) bent outward from the guard rim (26).

15. The shelf system of claim 13, characterized in that the beaded plates (43) of each bay (RZ) are equipped, on their end toward the corridor, with a beveled and/or curved inlet slide (45) for the pallets for carrying, goods (G).

16. The shelf system of claim 9, characterized in that the vertical shelf supports (8) are secured to horizontal fastening blocks (12), disposed in an insulation (10) of the ship hull (SR), by load bearers (13) that are connected to the ship hull (SR), and individual horizontal bearers (9) are horizontally braced against the hull (SR) by their lengthwise end toward the air duct with horizontal lateral bearers (14), via support blocks (15) disposed on an insulation (10) of the hull (SR).

17. The shelf system of claim 1, characterized in that each two bays (RZ) facing one another on either side of the corridor (1) are joined together and stabilized against one another by means of a bridge (11) that spans the corridor (1) and is located in connectionless fashion under the deck (SD) of the ship.

18. The shelf system of claim 1, characterized in that the shelving vehicle (2) travels on its bottom in a gangway (1a) of the corridor (1) that is lowered in the hull (SR) relative to the level on which the bays (RZ) stand and the vehicle on its top end is movable below the bridges (11) by means of positive guide means (16, 17), wherein as the positive guide means (16, 17), one toothed rack (16) is fixed below the bridges (11) and in the gangway (1a), and top and bottom gear wheels (17), which mesh with the toothed racks (16), are mounted on the shelving vehicle (2).

19. The shelf system of claim 1, characterized by a loading and unloading hatch (46), which has a flap (48) pivotably supported in the ship deck (SD) and closing off an opening (47) in the deck (SD) in sealed fashion, the flap being of polygonal and preferably rectangular shape, and has a hoisting device (49) for inserting the pallets (4) carrying goods (G) into and removing them from the shelf systems.

20. The shelf system of claim 19, characterized in that the hoisting device (49) has a vertical guide (51), which is fixed to the underneath of the ship deck (SD) and is movably joined to the hull (SR) via a movable bearing (50), and which has a vertical carriage (53) that is movable by motor along the vertical guide (51) and carries a cantilevered arm (52) that is vertically movable through the opening (47) in the deck (SD).

21. The shelf system of claim 1, characterized by a transport basket (54) that can be loaded with pallets (4) and unloaded of these pallets from all four sides, the basket having a rectangular shape and having centering protrusions (55) and inlet slides (56) for the pallets (4), and a roller track (60), which receives the transport basket 854) both between upright guides (57) and by its lower frame (58) in insertion depressions (59); the rollers (60a) of this roller track lift the pallets (4) from the frame (58) and move it out of the transport basket (54) and transfer them to a connected conveyor (62).

* * * * *